Oct. 20, 1931.  E. A. STONE  1,828,515
WINDOW FOR MOTOR VEHICLES
Filed March 13, 1929
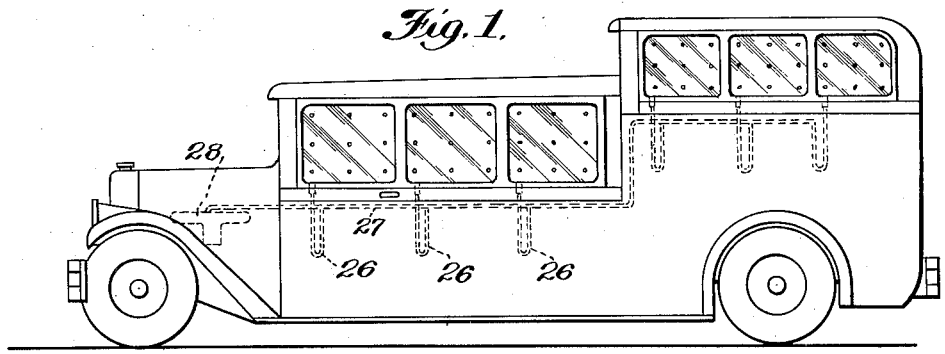
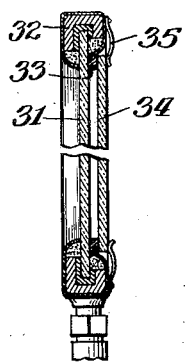
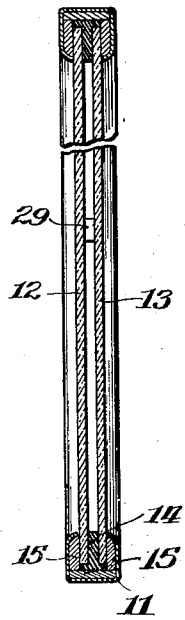
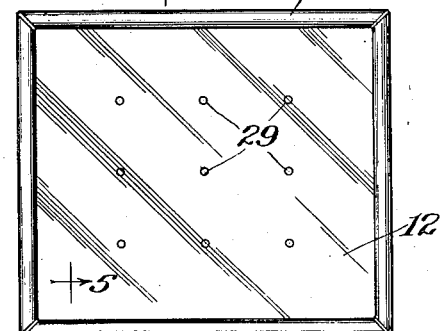
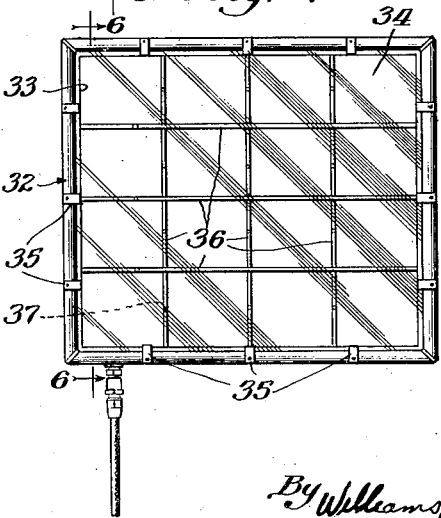
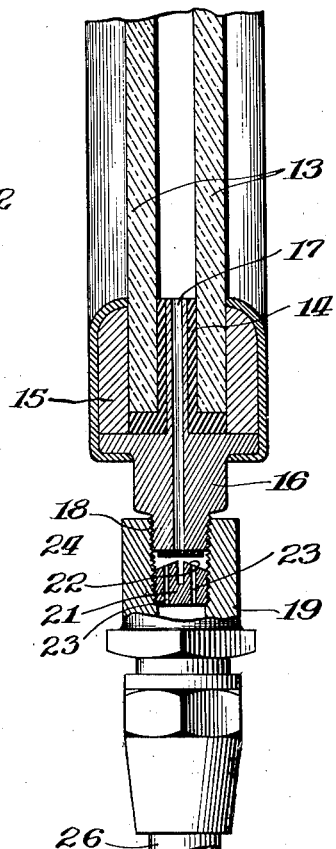
Inventor
Earl A. Stone
By Williams, Bradbury, McCaleb & Hinkle
Attys.

Patented Oct. 20, 1931

1,828,515

UNITED STATES PATENT OFFICE

EARL A. STONE, OF DETROIT, MICHIGAN, ASSIGNOR OF ONE-HALF TO DON O. SCOTT

WINDOW FOR MOTOR VEHICLES

Application filed March 13, 1929. Serial No. 346,569.

My invention relates to improvements in windshields and windows for motor vehicles.

In driving a motor vehicle in cold weather considerable inconvenience is experienced by the driver as well as by passengers due to the accumulation of moisture and frost upon the windshield and windows of the vehicle. This is particularly true in the case of passenger busses traveling long distances in which poor visibility of the scenery detracts greatly from the pleasure of the journey.

Windows are known in the prior art in which heated air is supplied to the space between a pair of spaced panes. Such constructions, however, have the disadvantage that provision must be made for a supply of heated air and furthermore the circulation of air between the panes causes dust and dirt to accumulate on the panes which it is difficult to remove.

An object of the invention is to provide an improved window construction.

A further object is to provide a window for a motor vehicle which will not collect moisture or frost.

A further object is to provide a window for a motor vehicle having means for preventing the condensation of moisture from the atmosphere thereon.

A further object is to provide a double window for a motor vehicle having means for preventing heat transfer from one pane to the other.

Other objects and advantages will become apparent as the description proceeds.

In accordance with the general features of the invention a window having a double pane is provided with means for exhausting the space between the panes to produce a heat insulating space for preventing heat transfer from one pane to the other.

Referring to the drawings:

Fig. 1 is a schematic illustration of a motor bus embodying the invention;

Fig. 2 is an enlarged cross section taken on line 2—2 of Fig. 3;

Fig. 3 is a side elevation illustrating a window embodying the invention;

Fig. 4 is an enlarged cross section illustrating a tube connected to the space between the panes;

Fig. 5 is a modified form of the device showing a removable pane; and

Fig. 6 is a cross section taken on line 6—6 of Fig. 5.

Referring particularly to Figs. 1 to 4, a frame 11 of U-shaped cross section is shown supporting a pair of panes 12 and 13. Interposed between the edges of the panes and extending around the entire periphery thereof is a strip 14 of flexible material such as rubber or the like. The outer ends of this strip may overhang the edges of the panes in order to retain the strip in position. A bar of wood or aluminum is clamped against the outer edge of each of the panes by the frame 11 and serves to force the panes toward each other and compress the material 14 therebetween.

In this construction the double pane is adapted to remain in the vehicle throughout the year in warm weather as well as in cold and if it is desirable to use a single pane in warm weather the entire frame may be removed and a frame having a single pane substituted therefor.

The peripherally sealed panes provide an enclosed space which is adapted to be exhausted of air by manifold suction. Connection is made to the space between the panes by providing a plug 16 having a tube 17 extending through the resilient strip 14. This plug is provided with a threaded boss 18 adapted to be connected to a threaded plug 19. The plug 19 is provided with a threaded opening for receiving a threaded insert 21 having a conical surface 22 which is in close proximity to the flat end of boss 18 when the plug is threaded on the boss. The insert 21 is provided with a plurality of passages 23. Interposed between the end of boss 18 and the conical face of the insert is a disc-shaped valve member 24 of shellacked Empire cloth or the like.

This valve member permits air to be withdrawn from the space between the panes but prevents air from moving in the reverse direction. The plug 19 is connected to a tube 26 which leads to a main tube 27 connected to a manifold 28 of the vehicle. The plugs from each of the windows in the vehicle are similarly connected. Thus upon the operation of the motor the suction in the manifold will exhaust the air space between the panes. Upon the release of the suction as, for instance, when the motor is stopped valve 24 will prevent the return of air to the space between the panes. The leakage of air to the space between the panes upon the stopping of the motor takes place so slowly that the vacuum in this space will be maintained at a high value for a long time.

The provision of the space between the panes insulates the inner pane from the cold of the outer pane and permits the inner pane to remain at the same temperature as the temperature in the interior of the vehicle. The moisture from the atmosphere in the interior of the vehicle will therefore have no tendency to condense and collect upon the inner panes. It is a well-known fact that frost upon the windows is due to the fact that a cold pane causes the moisture from the atmosphere to collect thereon and thereafter to freeze.

By providing the insulating space between the panes the inner pane will be at substantially the same temperature as the atmosphere in the interior of the vehicle. On account of the difference in the temperature of the panes the expansion of the panes will differ, making it impossible to fuse the edges of the panes together to provide a seal about the periphery. By the construction described a variation in the expansion of the panes is permissible on account of the resilient material surrounding the edges of the panes. Any air which penetrates the seal about the periphery of the panes will be thoroughly strained and free from dust with the result that the panes will not become dusty on the side facing the space between the panes.

In order to prevent the atmospheric pressure from breaking the panes when a vacuum is created in the space between the panes a plurality of spacers 29 of glass, bakelite or any other suitable material are located at spaced intervals between the panes.

Figs. 5 and 6 illustrate a modified form of the invention in which a pane 31 is mounted in a frame 32 of conventional construction. Located around the outer edge on the inner side of the pane is a strip 33 of resilient material which passes around the entire periphery of the panes. A second pane 34 is then placed over pane 31 and is clamped against the resilient strip 33 by a plurality of clamps 35 secured to the frame.

The space between these panes is exhausted in a manner similar to that described in the preferred embodiment of the invention. Panes 31 and 34 may be spaced by spacing strips 36 of glass, bakelite or other suitable transparent material. In order to permit free movement of air between the panes, a plurality of pin-holes 37 are provided in the strips. The pane 34 in this modification may be removed in warm weather by removing the clamps 35.

Having thus described my invention, what I claim is new and desire to secure by Letters Patent of the United States is:

1. In a motor vehicle, a window comprising a double pane having a sealed space therebetween, and a tube connected to said space and leading to the manifold of the vehicle whereby air will be withdrawn from said space when the motor is in operation.

2. In a motor vehicle, a window comprising a double pane having a space therebetween, a tube connected to said space and leading to the manifold of the motor whereby air is exhausted from said space during the operation of the motor, and a valve for preventing the return of air to said space.

3. In a motor vehicle, a plurality of windows comprising double panes having sealed spaces therebetween, and a plurality of tubes connected to said spaces and leading to a common juncture with the manifold of the vehicle whereby air will be withdrawn from said spaces when the motor is in operation.

4. In a motor vehicle, a plurality of windows comprising double panes having sealed spaces therebetween, a plurality of tubes connected to said spaces and leading to a common juncture with the manifold of the vehicle whereby air will be withdrawn from said spaces when the motor is in operation, and valve means for preventing the return of air to said spaces.

5. In a motor vehicle, a plurality of windows comprising double panes having sealed spaces therebetween, a plurality of tubes connected to said spaces and leading to a common juncture with the manifold of the vehicle whereby air will be withdrawn from said spaces when the motor is in operation, and a valve associated with each of said windows for preventing the return of air to the spaces between the panes thereof.

6. In a motor vehicle, a window comprising double panes having a sealed space therebetween, a row of spacing material interposed between said panes, said row of spacing material providing a passageway establishing communication between opposite sides of said row, and a tube connected to said space and leading to the manifold of the vehicle whereby air will be withdrawn from said space when the motor is in operation.

In witness whereof, I hereunto subscribe my name this 7th day of March, 1929.

EARL A. STONE.